(12) United States Patent
Nishimura

(10) Patent No.: US 11,859,674 B1
(45) Date of Patent: Jan. 2, 2024

(54) CLUTCH DEVICE AND MOTORCYCLE

(71) Applicant: Kabushiki Kaisha F.C.C., Hamamatsu (JP)

(72) Inventor: Masahiro Nishimura, Hamamatsu (JP)

(73) Assignee: KABUSHIKI KAISHA F.C.C., Shizuoka (JP)

( * ) Notice: Subject to any disclaimer, the term of this patent is extended or adjusted under 35 U.S.C. 154(b) by 0 days.

(21) Appl. No.: 18/373,337

(22) Filed: Sep. 27, 2023

(30) Foreign Application Priority Data

Sep. 28, 2022 (JP) ................................ 2022-154812

(51) Int. Cl.
*F16D 13/56* (2006.01)
*F16D 13/70* (2006.01)
*F16D 13/54* (2006.01)

(52) U.S. Cl.
CPC ............. *F16D 13/56* (2013.01); *F16D 13/54* (2013.01); *F16D 13/70* (2013.01); *F16D 2013/565* (2013.01)

(58) Field of Classification Search
CPC .......... F16D 13/52; F16D 13/54; F16D 13/56; F16D 2013/565; F16D 13/70; F16D 13/71; F16D 43/216
See application file for complete search history.

(56) References Cited

U.S. PATENT DOCUMENTS

| | | | | |
|---|---|---|---|---|
| 2014/0326570 A1* | 11/2014 | Isobe | ...................... | F16D 13/54 192/70.11 |
| 2015/0041275 A1* | 2/2015 | Satou | ...................... | F16D 13/56 192/66.31 |
| 2020/0158194 A1 | 5/2020 | Kataoka et al. | | |
| 2020/0292010 A1 | 9/2020 | Kobayashi et al. | | |
| 2021/0033154 A1* | 2/2021 | Isobe | ...................... | F16D 13/70 |

FOREIGN PATENT DOCUMENTS

| | | |
|---|---|---|
| EP | 3 998 412 A1 | 5/2022 |
| JP | 6894792 B2 | 6/2021 |
| JP | 2022-072810 A | 5/2022 |
| JP | 7203271 B1 | 1/2023 |
| JP | 7212193 B1 | 1/2023 |
| JP | 7225461 B1 | 2/2023 |
| WO | 2019/082597 A1 | 5/2019 |

OTHER PUBLICATIONS

Official Communication issued in Japanese Patent Application No. 2022-154812, dated Mar. 22, 2023.

* cited by examiner

*Primary Examiner* — Richard M Lorence
(74) *Attorney, Agent, or Firm* — Keating & Bennett, LLP

(57) ABSTRACT

A clutch device includes a clutch center and a pressure plate operable to move toward or away from the clutch center and rotatable relative to the clutch center. The pressure plate includes a pressure-side cam portion. The clutch center includes a center-side cam portion. The pressure plate includes a boss extending in movement directions. The clutch center includes a through hole in which a boss is insertable. The through hole extends along circumferential directions and allows movement of the boss along the circumferential directions and the movement directions. While a surface of the pressure-side cam portion and a surface of the center-side cam portion are in contact with each other, a distal end of the boss projects outward from the through hole.

5 Claims, 11 Drawing Sheets

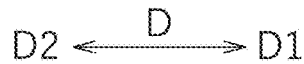
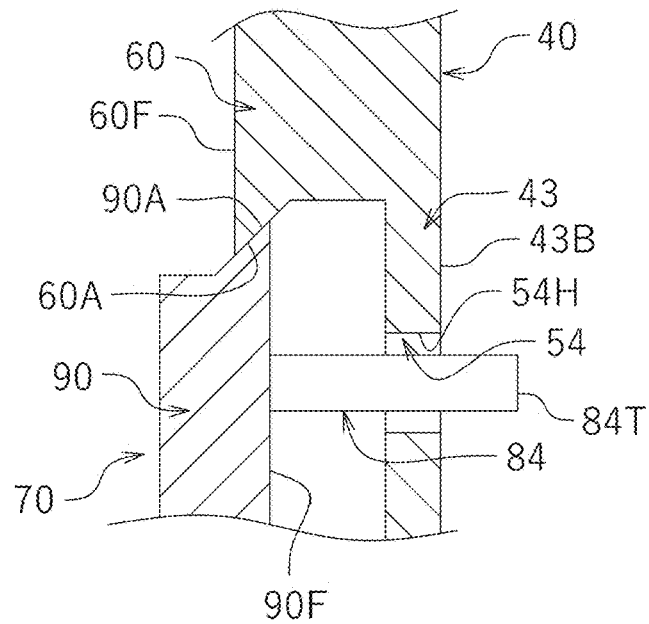
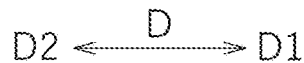
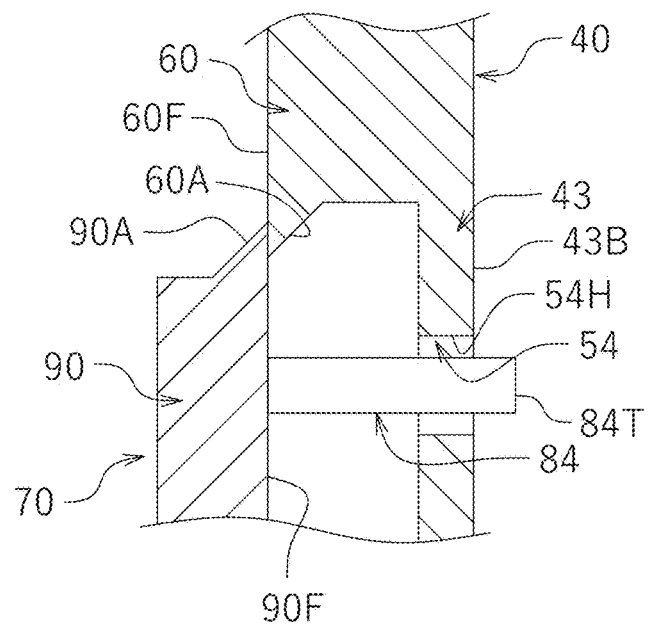

CLUTCH DEVICE AND MOTORCYCLE

CROSS REFERENCE TO RELATED APPLICATIONS

This application claims the benefit of priority to Japanese Patent Application No. 2022-154812 filed on Sep. 28, 2022. The entire contents of this application are hereby incorporated herein by reference.

BACKGROUND OF THE INVENTION

1. Field of the Invention

The present disclosure relates to a clutch device and a motorcycle. More particularly, the present disclosure relates to a clutch device that arbitrarily allows or interrupts transfer of a rotation driving force of an input shaft that is rotationally driven by a prime mover such as an engine to an output shaft, and also relates to a motorcycle including the clutch device.

2. Description of the Related Art

Conventional vehicles such as motorcycles include clutch devices. A clutch device is disposed between an engine and a drive wheel and allows or interrupts transfer of a rotation driving force of the engine to the drive wheel. The clutch device generally includes a plurality of input-side rotating plates that rotate by a rotation driving force of an engine and a plurality of output-side rotating plates connected to an output shaft that transfers the rotation driving force to a drive wheel. The input-side rotating plates and the output-side rotating plates are alternately arranged in a stacking direction, and the input-side rotating plates and the output-side rotating plates are brought into pressure contact with each other and are separated from each other so that transfer of a rotation driving force is allowed or interrupted.

Japanese Patent No. 6894972, for example, discloses a clutch device including a clutch center (clutch member) that holds output-side rotating plates (driven-side clutch plates), and a pressure plate (pressure member) movable toward or away from the clutch center. The pressure plate is configured to press the input-side rotating plates and the output-side rotating plates. In this manner, the clutch device includes an assembly of the clutch center and the pressure plate.

The clutch center and the pressure plate of the clutch device disclosed in Japanese Patent No. 6894972 includes an assist cam surface that generates a force in a direction from the pressure plate toward the clutch center to thereby increase a pressing force between the input-side rotating plates and the output-side plates when a rotation driving force of an engine is ready to be transferred to the output shaft, and a slipper cam surface that causes the pressure plate to move away from the clutch center to thereby reduce the pressing force between the input-side rotating plates and the output-side rotation plates when the rotation speed of the clutch center exceeds the rotation speed of the pressure plate.

Each of the clutch center and the pressure plate includes a cam portion including at least one of the assist cam surface and the slipper cam surface. A surface of the cam portion of the clutch center (hereinafter referred to as a center-side cam portion) toward the pressure plate and a surface of the cam portion of the pressure plate (hereinafter referred to as a pressure-side cam portion) toward the clutch center can be brought into contact (e.g., surface contact) with each other in some cases. That is, the pressure plate can ride on the clutch center. In particular, in combining the clutch center and the pressure plate, the pressure plate can ride on the clutch center. In this state, the clutch device cannot function appropriately. Therefore, it is desired to easily eliminate contact between the surface of the center-side cam portion toward the pressure plate and the surface of the pressure-side cam portion toward the clutch center.

SUMMARY OF THE INVENTION

Preferred embodiments of the present disclosure provide clutch devices each capable of easily eliminating contact between a surface of a center-side cam portion toward a pressure plate and a surface of a pressure-side cam portion toward a clutch center, and motorcycles including such clutch devices.

A clutch device according to a preferred embodiment of the present disclosure is a clutch device to allow or interrupt transfer of a rotation driving force of an input shaft to an output shaft and includes a clutch center housed in a clutch housing holding a plurality of input-side rotating plates rotationally driven by rotational driving of the input shaft, the clutch center holding a plurality of output-side rotating plates and being operable to be rotationally driven together with the output shaft, the input-side rotating plates and the output-side rotating plates being alternately arranged, and a pressure plate movable toward or away from the clutch center and rotatable relative to the clutch center, the pressure plate being operable to press the input-side rotating plates and the output-side rotating plates, wherein the pressure plate includes a pressure-side cam portion including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce a pressing force between the input-side rotating plates and the output-side rotating plates upon rotation relative to the clutch center, the clutch center includes a center-side cam portion including at least one of a center-side assist cam surface and a center-side slipper cam surface, the center-side assist cam surface being operable to generate a force in a direction from the pressure plate toward the clutch center in order to increase the pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate, and assuming directions in which the pressure plate moves are movement directions, a direction in which the pressure plate moves toward the clutch center is a first direction, and a direction in which the pressure plate moves away from the clutch center is a second direction, at least one of the pressure plate and the clutch center includes a boss extending in the movement directions, and the other of the pressure plate and the clutch center includes a through hole which penetrates therethrough along the movement directions and in which the boss is insertable, the through hole extends in circumferential directions and allows movement of the boss along the circumferential directions and the movement directions, and while a surface of the pressure-side cam portion on a side of the first direction and a surface of the center-side cam portion on a side of the second direction are in contact with each other, a distal end of the boss projects outward from the through hole.

In a clutch device according to a preferred embodiment of the present disclosure, while the surface of the pressure-side cam portion on the side of the first direction and the surface of the center-side cam portion on the side of the second direction are in contact with each other, the distal end of the boss projects outward from the through hole. Thus, in combining the clutch center and the pressure plate, for example, even if the surface of the pressure-side cam portion on the side of the first direction and the surface of the center-side cam portion on the side of the second direction contact each other and the pressure plate rides on the clutch center, the boss projecting outward from the through hole can be held. Since the through hole extends in the circumferential directions and allows movement of the boss in the circumferential directions and the movement directions, relative rotation of the clutch center and the pressure plate with the boss held can easily eliminate contact between the surface of the pressure-side cam portion on the side of the first direction and the surface of the center-side cam portion on the side of the second direction.

Preferred embodiments of the present invention provide clutch devices each capable of easily eliminating contact between a surface of a center-side cam portion toward a pressure plate and a surface of a pressure-side cam portion toward a clutch center.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7A is a cross-sectional view illustrating a state where a clutch center according to a preferred embodiment of the present invention and a pressure plate are normally combined.

FIG. 7B is a cross-sectional view illustrating a state where a pressure plate according to a preferred embodiment of the present invention rides on a clutch center.

DETAILED DESCRIPTION OF THE PREFERRED EMBODIMENTS

Figure 1:
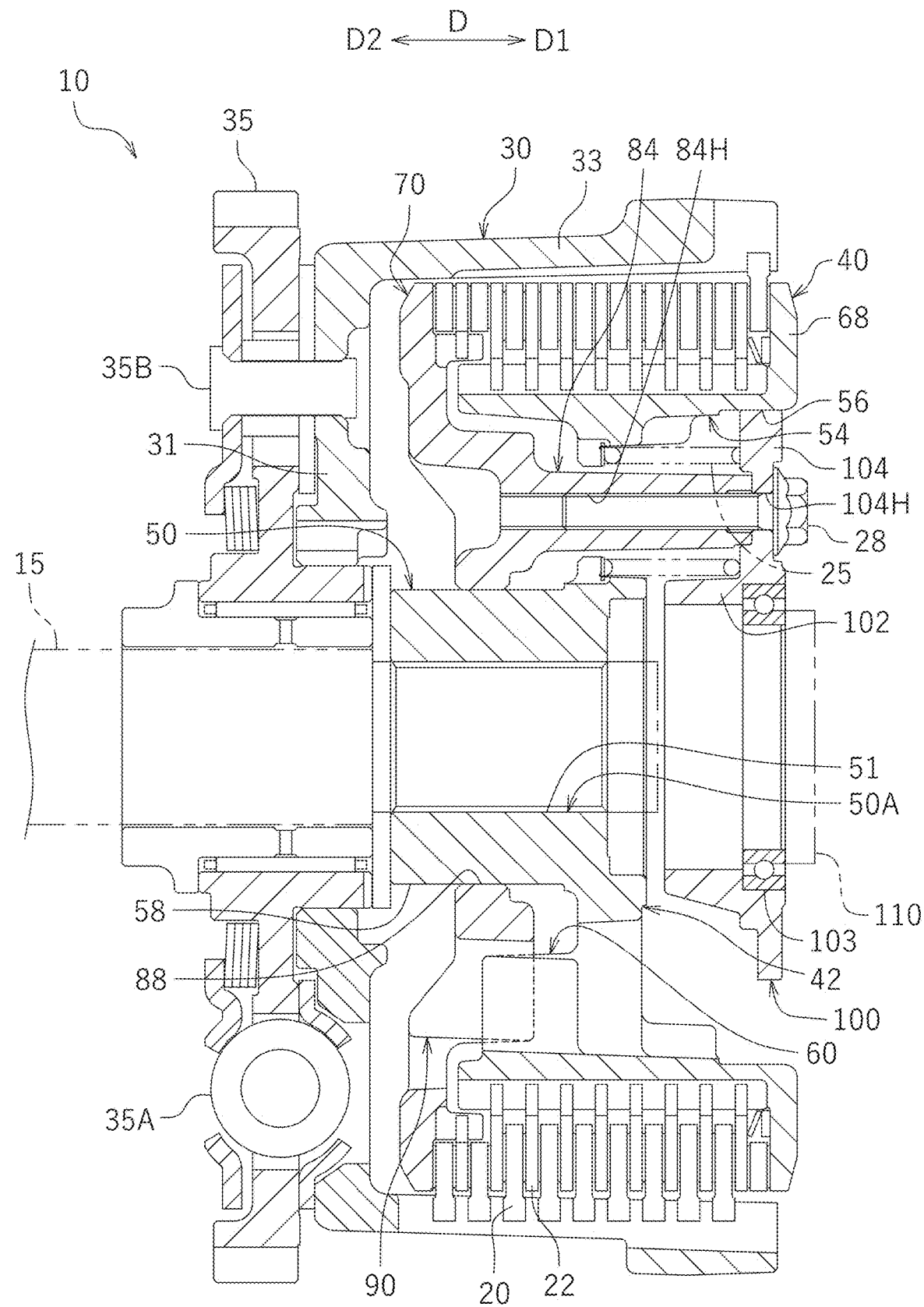
FIG. 1 is a cross-sectional view of a clutch device according to a first preferred embodiment of the present invention.

Clutch devices according to preferred embodiments of the present disclosure will be described hereinafter with reference to the drawings. The preferred embodiments described herein are, of course, not intended to particularly limit the present disclosure. Elements and features having the same functions are denoted by the same reference characters, and description for the same elements and features will not be repeated or will be simplified as appropriate.

First Preferred Embodiment

FIG. 1 is a cross-sectional view of a clutch device 10 according to this preferred embodiment. The clutch device 10 is provided in a vehicle such as a motorcycle, for example. The clutch device 10 allows or interrupts transfer of a rotation driving force of an input shaft (crankshaft) of an engine of the motorcycle to an output shaft 15, for example. The clutch device 10 allows or interrupts transfer of a rotation driving force of the input shaft to a drive wheel (rear wheel) through the output shaft 15. The clutch device 10 is disposed between the engine and a transmission.

In the following description, directions in which a pressure plate 70 of the clutch device 10 and the clutch center 40 are arranged will be referred to as directions D, a direction in which the pressure plate 70 moves toward the clutch center 40 will be referred to as a first direction D1, and a direction in which the pressure plate 70 moves away from the clutch center 40 will be referred to as a second direction D2. The directions D are examples of movement directions. Circumferential directions of the clutch center 40 and the pressure plate 70 will be referred to as circumferential directions S, one of the circumferential direction S from one pressure-side cam portion 90 to another pressure-side cam portion 90 will be referred to as a first circumferential direction S1 (see FIG. 4), and one of the circumferential direction S from the other pressure-side cam portion 90 to the one pressure-side cam portion 90 will be referred to as a second circumferential direction S2 (see FIG. 4). In this preferred embodiment, axial directions of the output shaft 15, axial directions of a clutch housing 30, axial directions of the clutch center 40, and axial directions of the pressure plate 70 are the same as the directions D. The pressure plate 70 and the clutch center 40 rotate in the first circumferential direction S1. It should be noted that the directions described above are defined simply for convenience of description, and are not intended to limit the state of installation of the clutch device 10 and do not limit the present disclosure.

The output shaft 15 is a hollow shaft. As illustrated in FIG. 1, one end of the output shaft 15 rotatably supports an input gear 35 described later and the clutch housing 30 through a bearing (not shown). The output shaft 15 fixedly supports a clutch center 40 through a nut (not shown). That is, the output shaft 15 rotates together with the clutch center 40. The other end of the output shaft 15 is coupled to a transmission (not shown) of an automobile, for example.

The clutch housing 30 is made of an aluminum alloy. The clutch housing 30 has a bottomed cylindrical shape. As illustrated in FIG. 1, the clutch housing 30 includes a bottom wall 31 having a substantially circular shape, and a side wall 33 extending from an edge of the bottom wall 31 in the first direction D1. The clutch housing 30 holds the plurality of input-side rotating plates 20.

As illustrated in FIG. 1, an input gear 35 is disposed on the bottom wall 31 of the clutch housing 30. The input gear 35 is fixed to the bottom wall 31 by a rivet 35B through a torque damper 35A. The input gear 35 meshes with a driving gear (not shown) that rotates by rotational driving of the input shaft of the engine. The input gear 35 is rotationally driven together with the clutch housing 30, independently of the output shaft 15.

The input-side rotating plates 20 is rotationally driven by rotational driving of the input shaft. As illustrated in FIG. 1, the input-side rotating plates 20 are held on the inner peripheral surface of the side wall 33 of the clutch housing 30. The input-side rotating plates 20 are held in the clutch housing 30 by spline fitting. The input-side rotating plates 20 are displaceable along the axial direction of the clutch housing 30. The input-side rotating plates 20 are rotatable together with the clutch housing 30.

The input-side rotating plates 20 are pushed against the output-side rotating plates 22. The input-side rotating plates 20 are ring-shaped flat plates. Each of the input-side rotating plates 20 is shaped by punching a thin plate of a steel plate cold commercial (SPCC) material into a ring shape. Friction members (not shown) of a plurality of paper sheets are attached to the front and back surfaces of the input-side rotating plates 20. A groove with a depth of several micrometers to several tens of micrometers, for example, is located between the friction members to hold clutch oil.

As illustrated in FIG. 1, the clutch center 40 is housed in the clutch housing 30. The clutch center 40 and the clutch housing 30 are concentrically disposed. The clutch center 40 includes a cylindrical body 42 and a flange 68 extending radially outward from the outer edge of the body 42. The clutch center 40 holds the plurality of output-side rotating plates 22 arranged alternately with the input-side rotating plates 20 in the directions D. The clutch center 40 is rotationally driven together with the output shaft 15.

Figure 2:
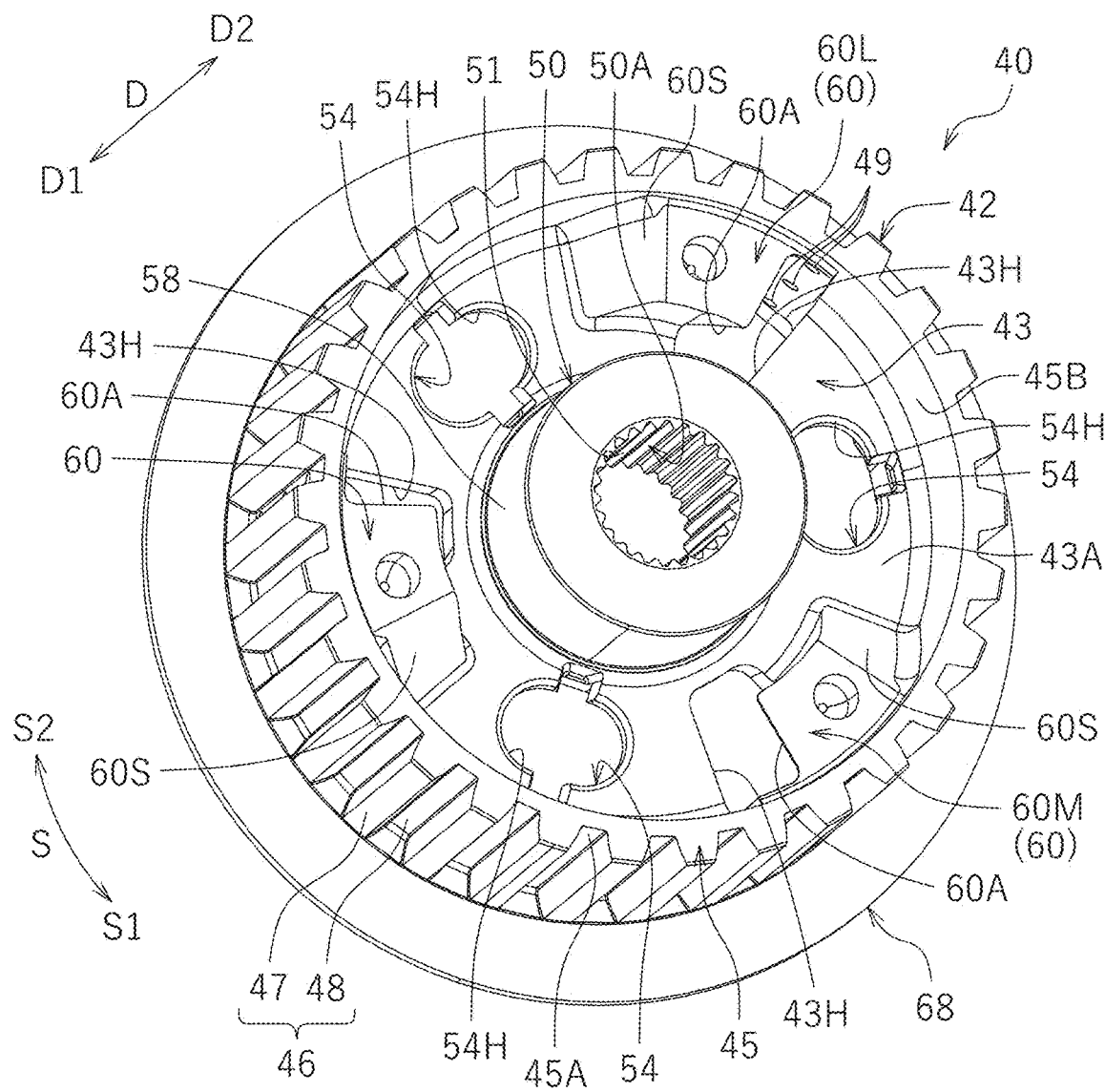
FIG. 2 is a perspective view of a clutch center according to the first preferred embodiment of the present invention.

As illustrated in FIG. 2, the body 42 includes a ring-shaped base wall 43, an outer peripheral wall 45 located radially outward of the base wall 43 and extending in the second direction D2, an output shaft holding portion 50 disposed at the center of the base wall 43, a plurality of center-side cam portions 60 connected to the base wall 43 and the outer peripheral wall 45, and a center-side fitting portion 58.

As illustrated in FIG. 2, the output shaft holding portion 50 has a cylindrical shape. The output shaft holding portion 50 projects from a surface 43A of the base wall 43 in the second direction D2. The surface 43A of the base wall 43 is an example of a surface of the body 42 on the side of the second direction D2. An end of the output shaft holding portion 50 on the side of the second direction is located ahead, in the second direction D2, of an end of the outer peripheral wall 45 on the side of the second direction D2. The output shaft holding portion has an insertion hole 51 which penetrates the output shaft holding portion 50 and in which the output shaft 15 is inserted and spline-fitted. An inner peripheral surface 50A of the output shaft holding portion 50 defining the insertion hole 51 includes a plurality of spline grooves positioned along the axial direction. The output shaft 15 is coupled to the output shaft holding portion 50.

As illustrated in FIG. 2, the outer peripheral wall 45 of the clutch center 40 is disposed radially outward of the output shaft holding portion 50. An outer peripheral surface 45A of the outer peripheral wall 45 includes a spline fitting portion 46. The spline fitting portion 46 includes a plurality of center-side fitting teeth 47 extending in the axial directions of the clutch center 40 along the outer peripheral surface 45A of the outer peripheral wall 45, a plurality of spline grooves 48 each formed between adjacent ones of the center-side fitting teeth 47 and extending in the axial directions of the clutch center 40, and oil flow holes 49. The center-side fitting teeth 47 hold the input-side rotating plates 20 and the output-side rotating plates 22. The plurality of center-side fitting teeth 47 arranged in the circumferential directions S. The plurality of center-side fitting teeth 47 are arranged at regular or substantially regular intervals in the circumferential directions S. The plurality of center-side fitting teeth 47 have the same or substantially the same shape. The center-side fitting teeth 47 project radially outward from the outer peripheral surface 45A of the outer peripheral wall 45. The oil flow holes 49 penetrate the outer peripheral wall 45 along the radial directions. Each of the oil flow holes 49 is located between adjacent ones of the center-side fitting teeth 47. That is, the oil flow holes 49 are located in the spline grooves 48. The oil flow holes 49 are located at the sides of the center-side cam portions 60. More specifically, the discharge holes 49 are located at the sides of the center-side assist cam surfaces 60A of the center-side cam portions 60. The oil flow holes 49 are located ahead of the center-side assist cam surface 60A in the second circumferential direction S2. The oil flow holes 49 are located ahead of spring housing portions 54 described later in the first circumferential direction S1. In this preferred embodiment, for example, three oil flow holes 49 are located in each of three portions of the outer peripheral wall 45 in the circumferential directions S. The oil flow holes 49 are arranged at regular or substantially regular intervals in the circumferential directions S. The oil flow holes 49 cause the inside and outside of the clutch center 40 to communicate with each other. The oil flow holes 49 allow clutch oil in the clutch center 40 to be discharged to the outside of the clutch center 40. In this preferred embodiment, the oil flow holes 49 allow clutch oil flowing at an inner peripheral surface 45B of the outer peripheral wall 45 to be discharged to the outside of the clutch center 40.

The output-side rotating plates 22 are held by the spline fitting portion 46 of the clutch center 40 and the pressure plate 70. A portion of the output-side rotating plates 22 is held by the center-side fitting teeth 47 of the clutch center 40 and the spline grooves 48 by spline fitting. Another portion of the output-side rotating plates 22 is held by a pressure-side fitting teeth 77 (see FIG. 4) described later of the pressure plate 70. The output-side rotating plates 22 are displaceable along the axial directions of the clutch center 40. The output-side rotating plates 22 are rotatable together with the clutch center 40.

The output-side rotating plates 22 are pushed against the input-side rotating plates 20. The output-side rotating plates 22 are ring-shaped flat plates. Each of the output-side rotating plates 22 is shaped by punching a thin plate of an SPCC material into a ring shape. The front and back surfaces of the output-side rotating plates 22 have grooves with depths of several micrometers to several tens of micrometers, for example, to hold clutch oil. The front and back surfaces of the output-side rotating plates 22 are subjected to a surface hardening treatment to enhance abrasion resistance. The friction members provided on the input-side rotating plates 20 may be provided on the output-side rotating plates 22 instead of the input-side rotating plates 20, or may be provided on both the input-side rotating plates 20 and the output-side rotating plates 22.

Figure 3:
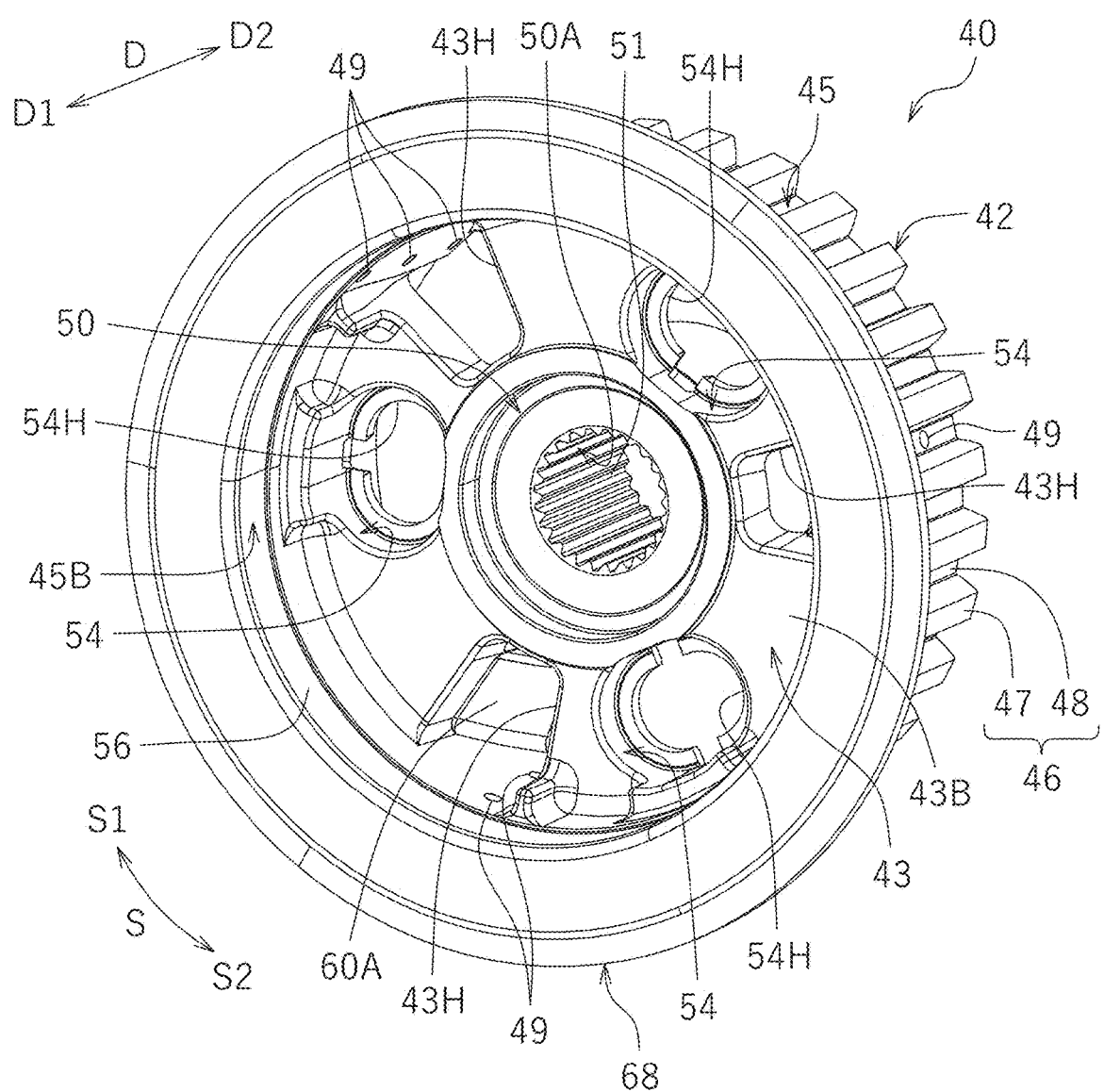
FIG. 3 is a plan view of a clutch center according to the first preferred embodiment of the present invention.

Each of the center-side cam portions 60 preferably has a trapezoidal shape including a cam surface of a slope defining an assist & slipper (registered trademark) mechanism that generates an assist torque as a force of increasing a pressing force (contact pressure force) between the input-side rotating plates 20 and the output-side rotating plates 22 or a slipper torque as a force of separating the input-side rotating plates 20 and the output-side rotating plates 22 from each other early and shifting these plates into a half-clutch state. The center-side cam portions 60 are formed in the body 42. More specifically, the center-side cam portions 60 project from the base wall 43 in the second direction D2. As illustrated in FIG. 3, the center-side cam portions 60 are arranged at regular or substantially regular intervals in the circumferential directions S of the clutch center 40. In this preferred embodiment, the clutch center 40 includes three center-side cam portions 60, but the number of the center-side cam portions 60 is not limited to three.

As illustrated in FIG. 2, the center-side cam portions 60 are located radially outward of the output shaft holding portion 50. Each of the center-side cam portions 60 includes the center-side assist cam surface 60A and the center-side slipper cam surface 60S. The center-side assist cam surface 60A is configured to generate a force in a direction from the pressure plate 70 toward the clutch center 40 in order to increase a pressing force (contact pressure force) between the input-side rotating plates 20 and the output-side rotating plates 22 in relative rotation to the pressure plate 70. In this preferred embodiment, when this force is generated, the position of the pressure plate 70 to the clutch center 40 does not change, and the pressure plate 70 does not need to approach the clutch center 40 physically. The pressure plate 70 may be physically displaced with respect to the clutch center 40. The center-side slipper cam surface 60S is configured to separate the pressure plate 70 from the clutch center 40 in order to reduce the pressing force (contact pressure force) between the input-side rotating plates 20 and the output-side rotating plates 22 in relative rotation to the pressure plate 70. In the center-side cam portions 60 adjacent to each other in the circumferential directions S, the center-side assist cam surface 60A of one center-side cam portion 60L and the center-side slipper cam surface 60S of the other center-side cam portion 60M are opposed to each other in the circumferential directions S.

As illustrated in FIGS. 2 and 3, the clutch center 40 includes spring housing portions 54. The spring housing portions 54 are located in the base wall 43. The spring housing portions 54 are recessed in the second direction D2 from a back surface 43B of the base wall 43. The back surface 43B of the base wall 43 is an example of a surface of the body 42 on the side of the first direction D1. Each of the spring housing portions 54 has an oval shape. The spring housing portions 54 house pressure springs 25 (see FIG. 1). The spring housing portions 54 are arranged at regular or substantially regular intervals in the circumferential directions S of the clutch center 40. In this preferred embodiment, for example, the clutch center 40 includes three spring housing portions 54, but the number of the spring housing portions 54 is not limited to three. The spring housing portions 54 are located ahead of the center-side slipper cam surface 60S in the first circumferential direction S1. The spring housing portions 54 are located ahead of the center-side assist cam surface 60A in the second circumferential direction S2. The spring housing portions 54 include through holes 54H which penetrate the spring housing portions 54 and in which bosses 84 (see FIG. 4) described later are inserted. The through holes 54H penetrate the base wall 43. The through holes 54H penetrate in the movement directions D. The through holes 54H extend in the circumferential directions S. The through holes 54H allow movement of the bosses 84 in the circumferential directions S and in the directions D. Each of the through holes 54H of this preferred embodiment has an oval shape. As illustrated in FIG. 1, the pressure springs 25 are housed in the spring housing portions 54. The pressure springs 25 are held by the bosses 84 described later inserted in the through holes 54H (see FIG. 3) of the spring housing portions 54. The pressure springs 25 bias the pressure plate 70 toward the clutch center 40 (i.e., in the first direction D1). The pressure springs are, for example, coil springs obtained by radially winding spring steel.

As illustrated in FIGS. 2 and 3, the clutch center 40 includes center-side cam holes 43H penetrating a portion of the base wall 43. The center-side cam holes 43H penetrate the base wall 43 in the directions D. The center-side cam holes 43H extend from portions on the side of the output shaft holding portion 50 to the outer peripheral wall 45. Each of the center-side cam holes 43H is located between the center-side assist cam surface 60A of the center-side cam portion 60 and the spring housing portions 54. When seen in the axial direction of the clutch center 40, the center-side assist cam surface 60A overlaps with a portion of the center-side cam hole 43H.

As illustrated in FIG. 3, the clutch center 40 includes a center-side sliding surface 56 on which a lifter plate 100 (see FIG. 1) slides. The center-side sliding surface 56 is disposed at the inner peripheral surface 45B of the outer peripheral wall 45. The center-side sliding surface 56 is located ahead of the back surface 43B of the base wall 43 in the first direction D1.

As illustrated in FIG. 2, the center-side fitting portion 58 is disposed at the outer peripheral surface of the output shaft holding portion 50. The center-side fitting portion 58 is slidably fitted in a pressure-side fitting portion 88 described later (see FIG. 4). A gap is located between the center-side fitting portion 58 and the pressure-side fitting portion 88. In this preferred embodiment, for example, the outer diameter of the center-side fitting portion 58 is smaller by about 0.1 mm than the inner diameter of the pressure-side fitting portion 88. A dimensional tolerance between the outer diameter of the center-side fitting portion 58 and the inner diameter of the pressure-side fitting portion 88 is, for example, about 0.1 mm or more and about 0.5 mm or less. The length of the center-side fitting portion 58 in the directions D is longer than a travel distance (stroke) of the pressure plate 70 in the directions D.

As illustrated in FIG. 1, the pressure plate 70 is housed in the clutch housing 30. The pressure plate 70 is located between the clutch housing 30 and the clutch center 40. As illustrated in FIG. 1, the pressure plate 70 is movable toward or away from the clutch center 40 and rotatable relative to the clutch center 40. The pressure plate 70 is configured to press the input-side rotating plates 20 and the output-side rotating plates 22. The pressure plate 70 is disposed coaxially with the clutch center 40 and the clutch housing 30. The pressure plate 70 includes a body 72, and a flange 98 connected to the outer edge of the body 72 on the side of the second direction D2 and extending radially outward. The body 72 projects ahead of the flange 98 in the first direction D1. The pressure plate 70 holds the plurality of output-side rotating plates 22 arranged alternately with the input-side rotating plates 20. The output-side rotating plates 22 are displaceable along the axial directions of the pressure plate 70. The output-side rotating plates 22 are rotatable together with pressure plate 70.

Figure 4:
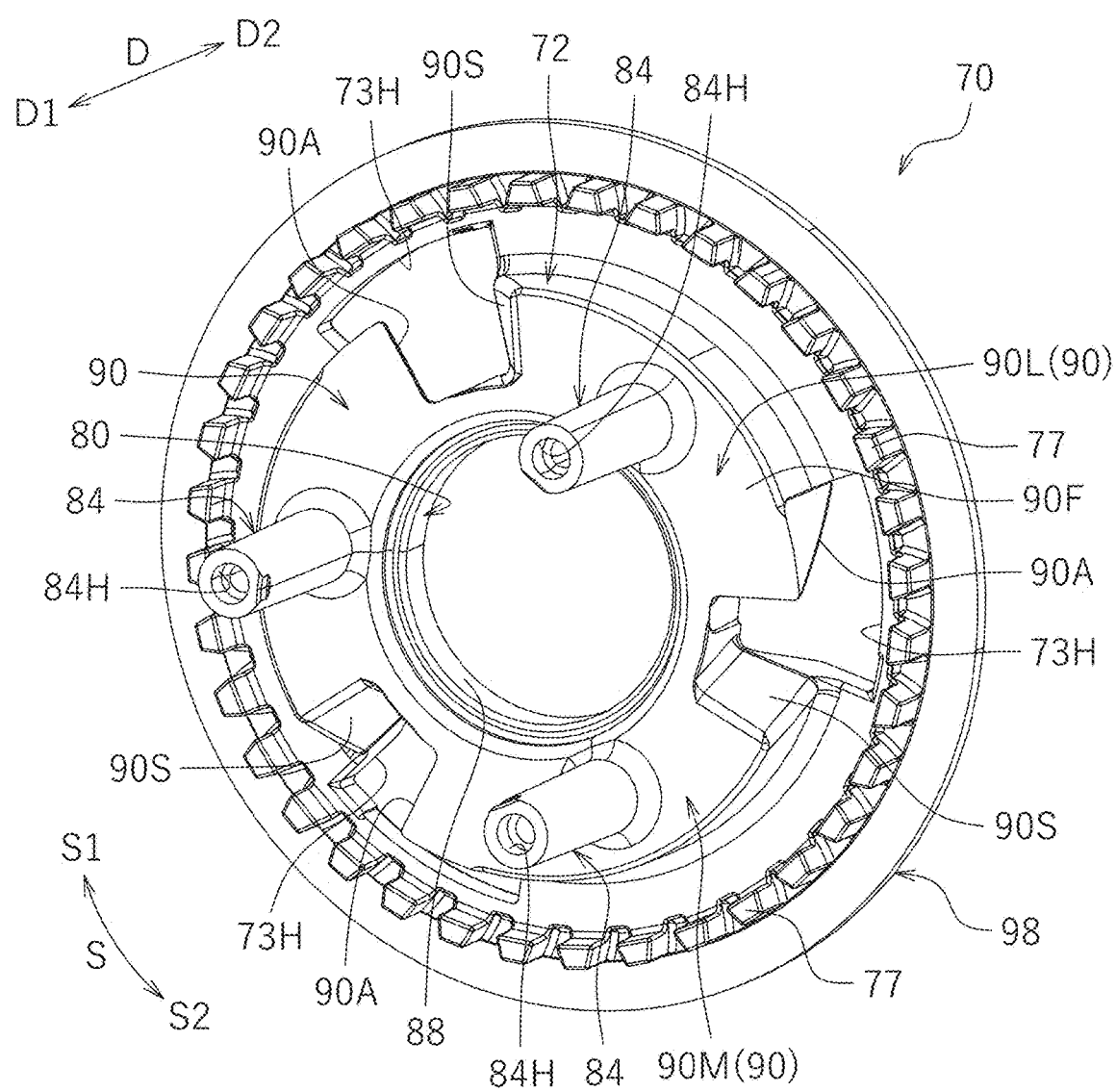
FIG. 4 is a perspective view of a pressure plate according to the first preferred embodiment of the present invention.

As illustrated in FIG. 4, the body 72 includes a fitting hole 80, the plurality of pressure-side cam portions 90, and the pressure-side fitting portion 88.

As illustrated in FIG. 4, the flange 98 extends radially outward from the outer edge of the body 72. The flange 98 and the flange 68 of the clutch center 40 sandwich the input-side rotating plates 20 and the output-side rotating plates 22. The flange 98 applies a pressing force to the input-side rotating plates 20 and the output-side rotating plates 22.

As illustrated in FIG. 4, the fitting hole 80 is located at the center of the body 72. The fitting hole 80 penetrates the body 72 in the directions D. The output shaft holding portion 50 of the clutch center 40 is inserted in the fitting hole 80.

As illustrated in FIG. 4, the pressure-side fitting portion 88 is disposed at the inner peripheral surface of the body 72 to define the fitting hole 80. The pressure-side fitting portion 88 is slidably fitted onto the center-side fitting portion 58 (see FIG. 2).

Figure 5:
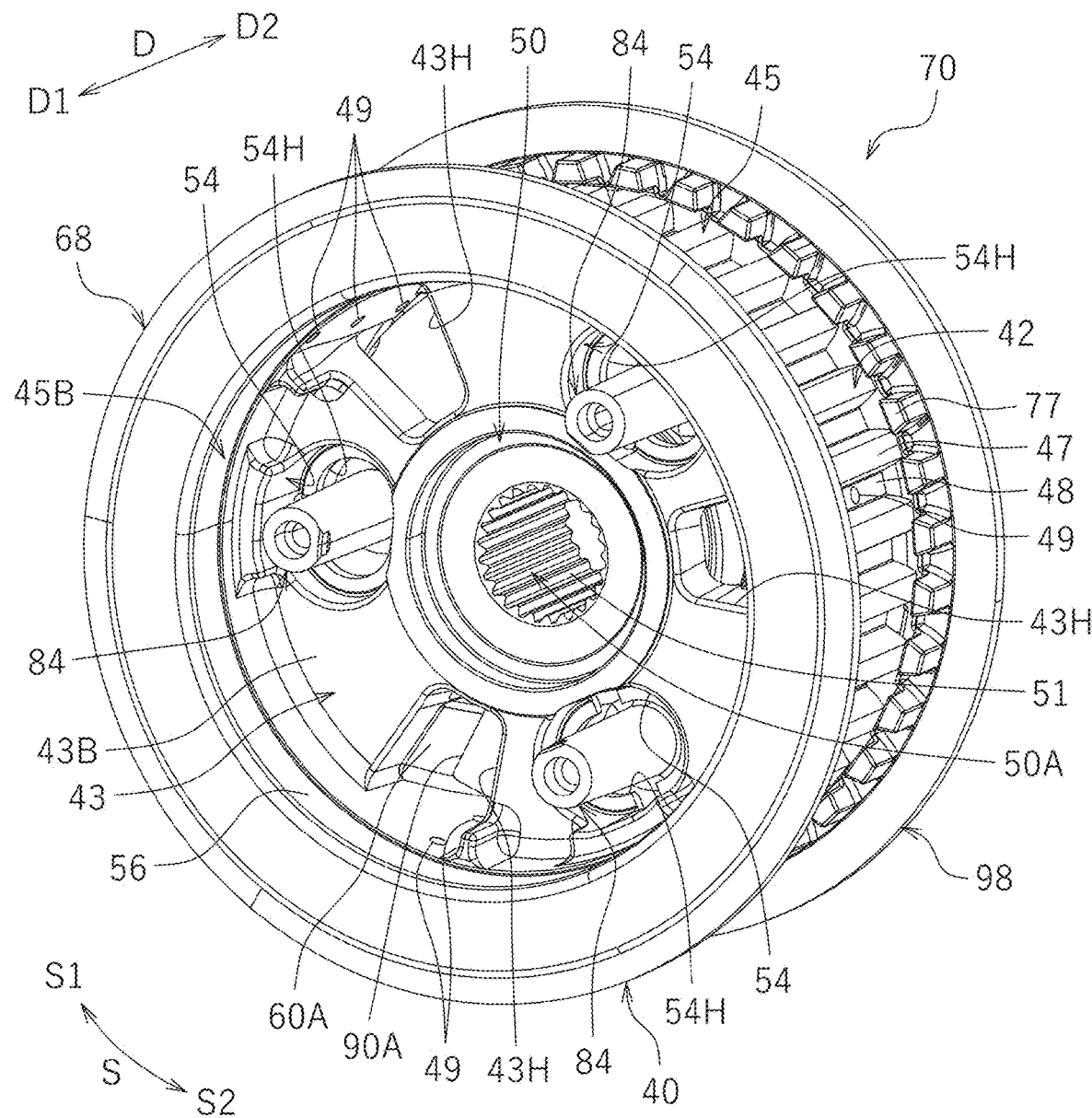
FIG. 5 is a perspective view illustrating a state where a clutch center according to the first preferred embodiment of the present invention and a pressure plate are combined.

Each of the pressure-side cam portions 90 preferably has a trapezoidal shape including a cam surface of a slope constituting an assist & slipper (registered trademark) mechanism that slides on the center-side cam portions 60 and generates an assist torque or a slipper torque. The pressure-side cam portions 90 project from the flange 98 in the first direction D1. As illustrated in FIG. 5, the pressure-side cam portions 90 are arranged at regular or substantially regular intervals in the circumferential directions S of the pressure plate 70. In this preferred embodiment, for example, the pressure plate 70 includes three pressure-side cam portions 90, but the number of the pressure-side cam portions 90 is not limited to three.

As illustrated in FIG. 4, the pressure-side cam portion is located radially outward of the fitting hole 80. Each of the pressure-side cam portions 90 includes a pressure-side assist cam surface 90A and a pressure-side slipper cam surface 90S. The pressure-side assist cam surface 90A can be brought into contact with the center-side assist cam surface 60A. The pressure-side assist cam surface 90A is configured to generate a force in a direction from the pressure plate 70 toward the clutch center 40 in order to increase a pressing force (contact pressure force) between the input-side rotating plates 20 and the output-side rotating plates 22 in relative rotation to the clutch center 40. The pressure-side slipper cam surface 90S can be brought into contact with the center-side slipper cam surface 60S. The pressure-side slipper cam surface 90S is configured to separate the pressure plate 70 from the clutch center 40 in order to reduce a pressing force (contact pressure force) between the input-side rotating plates 20 and the output-side rotating plates 22 in relative rotation to the clutch center 40. In the pressure-side cam portions 90 adjacent to each other in the circumferential directions S, the pressure-side assist cam surface 90A of one pressure-side cam portion 90L and the pressure-side slipper cam surface 90S of the other pressure-side cam portion 90M are opposed to each other in the circumferential directions S.

Figure 6A:
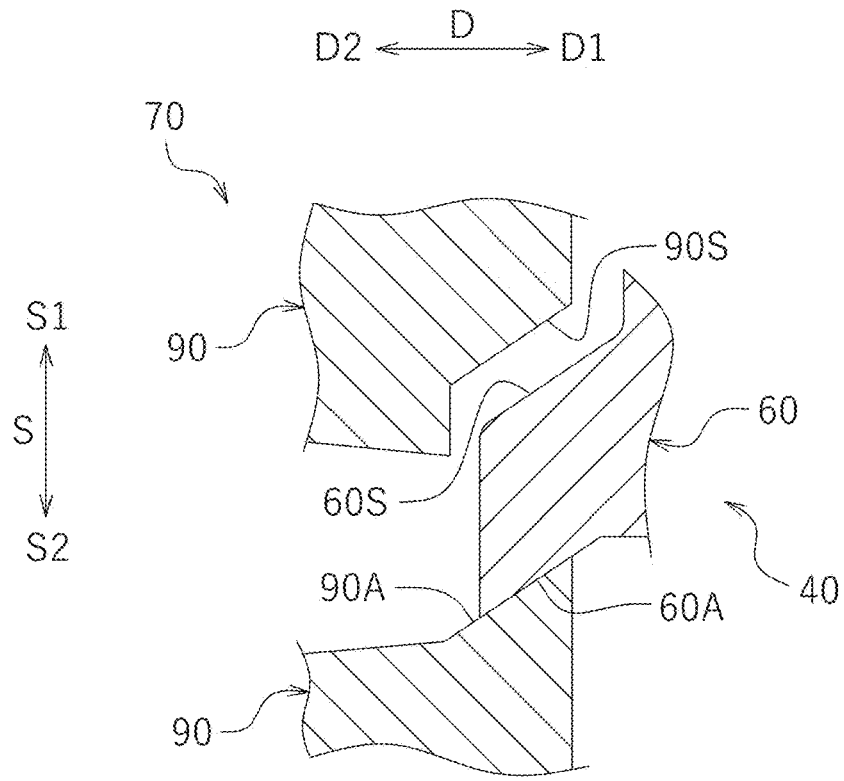
FIG. 6A is a schematic view for describing effects of a center-side assist cam surface and a pressure-side assist cam surface.

Advantages of the center-side cam portions 60 and the pressure-side cam portions 90 will now be described. When the rotation speed of the engine increases so that a rotation driving force input to the input gear 35 and the clutch housing 30 is thereby allowed to be transferred to the output shaft 15 through the clutch center 40, a rotation force in the first circumferential direction S1 is applied to the pressure plate 70, as illustrated in FIG. 6A. Thus, with the effects of the center-side assist cam surface 60A and the pressure-side assist cam surface 90A, a force in first direction D1 is generated in the pressure plate 70. Accordingly, a contact pressure force between the input-side rotating plates 20 and the output-side rotating plates 22 increases.

Figure 6B:
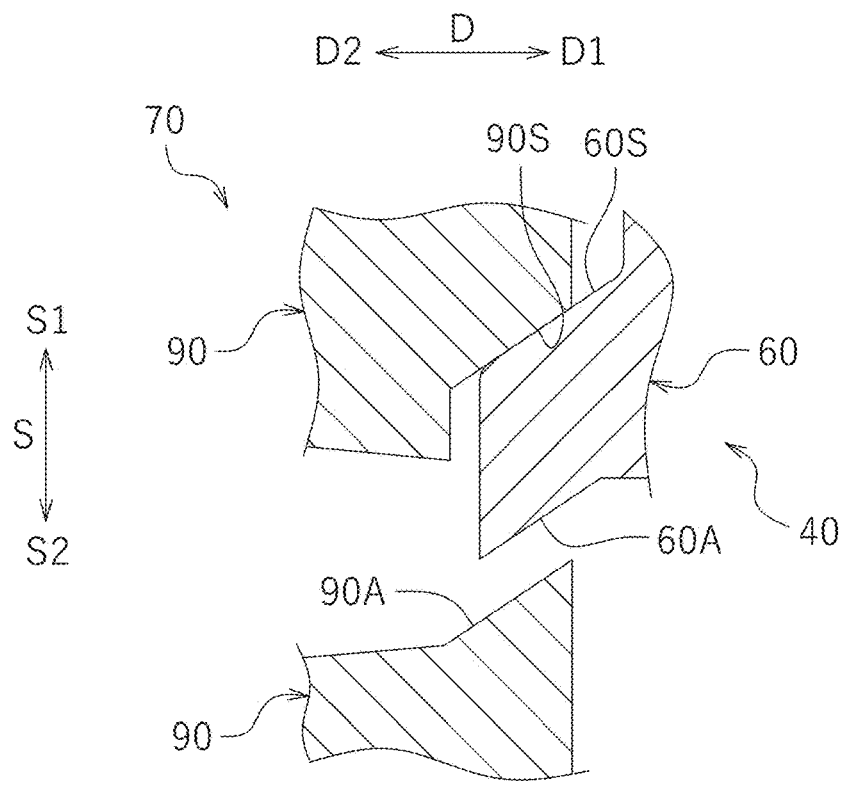
FIG. 6B is a schematic view for describing effects of a center-side slipper cam surface and a pressure-side slipper cam surface.

On the other hand, when the rotation speed of the output shaft 15 exceeds the rotation speed of the input gear 35 and the clutch housing 30 and a back torque is generated, a rotation force in the first circumferential direction S1 is applied to the clutch center 40, as illustrated in FIG. 6B. Thus, with the effects of the center-side slipper cam surface 60S and the pressure-side slipper cam surface 90S, the pressure plate 70 moves in the second direction D2 and releases a contact pressure force between the input-side rotating plates 20 and the output-side rotating plates 22. In this manner, it is possible to avoid problems in the engine and the transmission caused by the back torque.

As illustrated in FIG. 4, the pressure plate 70 has pressure-side cam holes 73H penetrating the body 72 and a portion of the flange 98. The pressure-side cam holes 73H are located radially outward of the fitting hole 80. The pressure-side cam holes 73H extend from portions on the side of the fitting hole 80 to the radially outside of the pressure-side cam portion 90. Each of the pressure-side cam holes 73H is located between adjacent ones of the pressure-side cam portions 90. Each of the pressure-side cam holes 73H is located between the pressure-side assist cam surface 90A and the pressure-side slipper cam surface 90S of adjacent ones of the pressure-side cam portions 90. When seen in the axial direction of the pressure plate 70, the pressure-side assist cam surface 90A overlaps with portions of the pressure-side cam holes 73H.

As illustrated in FIG. 4, the pressure plate 70 includes the plurality of pressure-side fitting teeth 77 formed on the flange 98. The pressure-side fitting teeth 77 hold the input-side rotating plates 20 and the output-side rotating plates 22. The pressure-side fitting teeth 77 are located radially outward of the fitting hole 80. The pressure-side fitting teeth 77 are located radially outward of the pressure-side cam portions 90. The pressure-side fitting teeth 77 project in the first direction D1 from the flange 98. The pressure-side fitting teeth 77 are arranged in the circumferential directions S. The pressure-side fitting teeth 77 are arranged at regular or substantially regular intervals in the circumferential directions S.

As illustrated in IG. 4, the pressure plate 70 includes a plurality of (for example, three in this preferred embodiment) bosses 84. The bosses 84 support the clutch center 40. The bosses 84 are arranged at regular or substantially regular intervals in the circumferential directions S. Each of the bosses 84 has a cylindrical shape. The bosses 84 are located radially outward of the fitting hole 80. The bosses 84 extend in the directions D. The bosses 84 are disposed on the pressure-side cam portions 90. Each of the bosses 84 is located between the pressure-side assist cam surfaces 90A and the pressure-side slipper cam surface 90S. The bosses 84 extend from surfaces 90F of the pressure-side cam portions 90 toward the clutch center 40 (i.e., in the first direction D1). The bosses 84 have screw holes 84H in which bolts 28 (see FIG. 1) are inserted. The screw holes 84H extend in the axial directions of the pressure plate 70. The surfaces 90F of the pressure-side cam portions 90 is an example of surfaces of the pressure-side cam portions 90 on the side of the first direction D1 (toward the clutch center 40).

FIG. 5 is a perspective view illustrating a state where the clutch center 40 and the pressure plate 70 are combined (hereinafter referred to as a combined state). In the state illustrated in FIG. 5, the pressure-side assist cam surface 90A and the center-side assist cam surface 60A are not in contact with each other, and the pressure-side slipper cam surface 90S and the center-side slipper cam surface 60S are not in contact with each other. At this time, the pressure plate 70 is closest to the clutch center 40. In the combined state, the pressure-side assist cam surface 90A and the center-side assist cam surface 60A may be in contact with each other, and the pressure-side slipper cam surface 90S and the center-side slipper cam surface 60S may not in contact with each other.

As illustrated in FIG. 7A, in the combined state, distal ends 84T of the bosses 84 projects outward from the through holes 54H. The distal ends 84T of the bosses 84 are ends of the bosses 84 on the side of the first direction D1. As illustrated in FIG. 7B, while the surfaces 90F of the pressure-side cam portions 90 and surfaces 60F of the center-side cam portions 60 are in contact (e.g., surface contact) with each other (i.e., in the state where the pressure plate 70 rides on the clutch center 40), the distal ends 84T of the bosses 84 project outward from the through holes 54H. More specifically, while the surfaces 90F of the pressure-side cam portions 90 and the surfaces 60F of the center-side cam portions 60 are in contact with each other, the distal ends 84T of the bosses 84 project outward from the back surface 43B of the base wall 43. While the surfaces 90F of the pressure-side cam portions 90 and the surfaces 60F of the center-side cam portions are in contact with each other, the distal ends 84T of the bosses 84 are located ahead of the back surface 43B in the first direction D1. Thus, in combining the clutch center 40 and the pressure plate 70 with each other, for example, even if the surfaces 90F of the pressure-side cam portions 90 and the surface 60F of the center-side cam portions 60 contact each other, the bosses 84 projecting outward from the through holes 54H can be held. Rotation of the clutch center 40 in the circumferential directions S with the bosses 84 held, for example, can cancel the state where the pressure plate 70 rides on the clutch center 40, and the positional relationship among the pressure-side assist cam surface 90A, the center-side assist cam surface 60A, the pressure-side slipper cam surface 90S, and the center-side slipper cam surface 60S can be corrected. The surfaces 60F of the center-side cam portions 60 are an example of surfaces of the center-side cam portions 60 on the side of the second direction D2 (toward the pressure plate 70).

Figure 8:
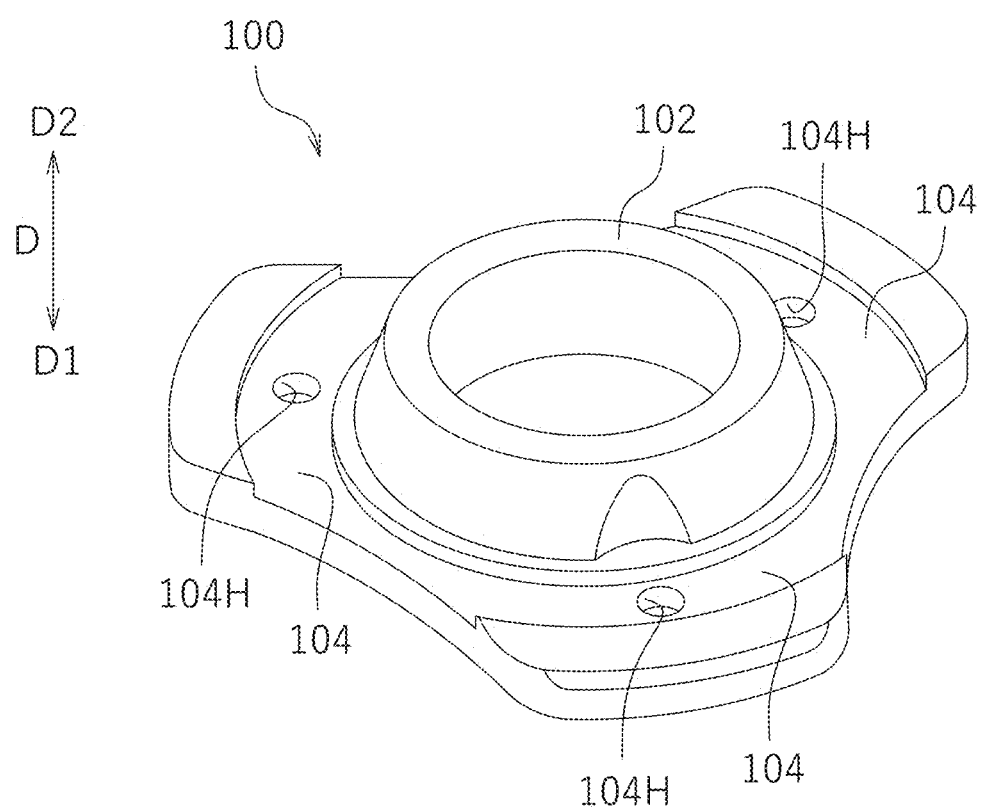
FIG. 8 is a perspective view of a lifter plate according to a preferred embodiment of the present invention.

As illustrated in FIG. 1, the clutch device 10 includes the lifter plate 100. The lifter plate 100 is used to displace the pressure plate 70 in the directions D. The lifter plate 100 is fixed to the pressure plate 70 with the bolts 28. The lifter plate 100 rotates together with the pressure plate 70. The lifter plate 100 slides in the directions D along the center-side sliding surface 56 of the clutch center 40. The lifter plate 100 moves in the directions D relative to the clutch center 40 and rotates relative to the clutch center 40. As illustrated in FIG. 8, the lifter plate 100 includes a body portion 102 having a substantially cylindrical shape and extension portions 104 extending radially outward from the body portion 102. As illustrated in FIG. 1, the body portion 102 houses a release bearing 103. The release bearing 103 is pressed by a release fork 110 of a clutch release mechanism (not shown). The clutch release mechanism herein is a mechanical device that presses the release bearing 103 toward the output shaft (i.e., toward the second direction D2) by driver's operation of a clutch operation lever (not shown) in a vehicle such as a motorcycle on which the clutch device 10 is mounted. In FIG. 1, the release fork 110 is indicated by the chain double-dashed lines.

As illustrated in FIG. 1, the extension portions 104 support the pressure springs 25 housed in the spring housing portions 54 of the clutch center 40. The extension portions 104 are portions that slide in the directions D along the center-side sliding surface 56 of the clutch center 40. In this preferred embodiment, for example, the lifter plate 100 includes three extension portions 104. The three extension portions 104 are arranged at regular or substantially regular intervals in the circumferential directions S. The extension portions 104 have insertion holes 104H in which the bolts 28 to fix the lifter plate 100 to the pressure plate 70 are inserted.

The clutch device 10 is filled with a predetermined amount of clutch oil. Clutch oil passes through the center-side cam holes 43H from the sides of the back surface 43B of the base wall 43 of the clutch center 40 to be distributed in the clutch center 40 and the pressure plate 70. Clutch oil also flows at the outer peripheral surface 45A of the outer peripheral wall 45 through the oil flow holes 49 from the side of the back surface 43B of the base wall 43 of the clutch center 40. Then, clutch oil is supplied to the input-side rotating plates 20 and the output-side rotating plates 22 at the outer peripheral surface 45A of the outer peripheral wall 45. Clutch oil reduces or prevents absorption of heat and abrasion of the friction members. The clutch device 10 according to this preferred embodiment is a so-called multiplate wet friction clutch device.

Operation of the clutch device 10 according to this preferred embodiment will now be described. As described above, the clutch device 10 is disposed between the engine and the transmission of the motorcycle, and allows or interrupts transfer of a rotation driving force of the engine to the transmission by driver's operation of a clutch operation lever.

In the clutch device 10, in a case where the driver of the motorcycle does not operate the clutch operation lever, the release fork 110 of the clutch release mechanism (not shown) does not press the release bearing 103, and thus, the pressure plate 70 presses the input-side rotating plates 20 with a biasing force (elastic force) of the pressure springs 25. Accordingly, the clutch center 40 enters a clutch-ON state in which the input-side rotating plates 20 and the output-side rotating plates 22 are pushed against each other to be friction coupled, and is rotationally driven. That is, a rotation driving force of the engine is transferred to the clutch center 40, and the output shaft 15 is rotationally driven.

In the clutch-ON state, with the effect of the center-side assist cam surface 60A and the pressure-side assist cam surface 90A, a force in the first direction D1 is generated in the pressure plate 70. Accordingly, a contact pressure force between the input-side rotating plates 20 and the output-side rotating plates 22 increases. In addition, when the rotation speed of the output shaft 15 exceeds the rotation speed of the input gear 35 and the clutch housing 30 to cause a back torque in the clutch-ON state, the pressure plate 70 moves in the second direction D2 to cancel the contact pressure force between the input-side rotating plates 20 and the output-side rotating plates 22 with the effect of the center-side slipper cam surface 60S and the pressure-side slipper cam surface 90S.

On the other hand, in the clutch device 10, when the driver of the motorcycle operates the clutch operation lever in the clutch-ON state, the release fork 110 of the clutch release mechanism (not shown) presses the release bearing 103, and thus, the pressure plate 70 is displaced in a direction away from the clutch center 40 (second direction D2) against a biasing force of the pressure springs 25. Accordingly, the clutch center 40 enters a clutch-OFF state in which friction coupling between the input-side rotating plates 20 and the output-side rotating plates 22 is canceled, and thus, rotational driving attenuates or stops. That is, a rotation driving force of the engine is interrupted to the clutch center 40. At this time, since the center-side assist cam surface 60A and the pressure-side assist cam surface 90A are separated from each other and the center-side slipper cam surface 60S and the pressure-side slipper cam surface 90S are separated from each other, no assist torque and no stopper torque do not occur.

Then, when the driver cancels the clutch operation lever in the clutch-OFF state, pressing of the release bearing 103 by the release fork 110 of the clutch release mechanism (not shown) through the push member 16B is canceled, and thus, the pressure plate 70 is displaced with a biasing force of the pressure springs 25 to a direction (first direction D1) of moving toward the clutch center 40.

As described above, in the clutch device 10 according to this preferred embodiment, while the surfaces 90F of the pressure-side cam portions 90 and the surfaces 60F of the center-side cam portions 60 are in contact with each other, the distal ends 84T of the bosses 84 project outward from the through holes 54H. Thus, in combining the clutch center 40 and the pressure plate 70, for example, even if the surfaces 90F of the pressure-side cam portions 90 and the surfaces 60F of the center-side cam portions 60 contact each other and the pressure plate 70 rides on the clutch center 40, the bosses 84 projecting outward from the through holes 54H can be held. Since the through holes 54H extend in the circumferential directions S and allows movement of the bosses 84 in the circumferential directions S and the directions D, relative rotation of the clutch center 40 and the pressure plate 70 with the bosses 84 held can easily eliminate contact between the surfaces 90F of the pressure-side cam portions 90 and the surfaces 60F of the center-side cam portions 60.

In the clutch device 10 according to this preferred embodiment, the clutch center 40 includes the body 42 including the center-side cam portions 60, and the spring housing portions 54 recessed in the second direction D2 from the back surface 43B of the base wall 43 of the body 42 and housing the pressure springs 25 that biases the pressure plate 70 in the first direction D1, the bosses 84 are formed on the pressure plate 70, the through holes 54H are formed in the spring housing portions 54 of the clutch center 40, and the distal ends 84T of the bosses 84 are located ahead of the back surface 43B of the base wall 43 of the body 42 in the first direction D1 while the surfaces 90F of the pressure-side cam portions 90 and the surfaces 60F of the center-side cam portions 60 are in contact with each other. In this configuration, even when the pressure plate 70 rides on the clutch center 40, the bosses 84 on the pressure plate 70 project outward from the through holes 54H in the spring housing portions 54. At this time, the distal ends 84T of the bosses 84 are located ahead of the back surface 43B of the base wall 43 of the body 42 in the first direction D1. Accordingly, the bosses 84 can be easily held.

In the clutch device 10 according to this preferred embodiment, each of the center-side cam portions 60 includes the center-side assist cam surface 60A and the center-side slipper cam surface 60S, and each of the pressure-side cam portions 90 includes the pressure-side assist cam surface 90A and the pressure-side slipper cam surface 90S. In this configuration, contact between the surfaces 90F of the pressure-side cam portions 90 and the surfaces 60F of the center-side cam portions 60 can be easily eliminated, and thus, effects of the center-side assist cam surface 60A and the pressure-side assist cam surface 90A can be appropriately exerted so that a force in the first direction D1 is generated in the pressure plate 70. In addition, effects of the center-side slipper cam surface 60S and the pressure-side slipper cam surface 90S are appropriately exerted so that the pressure plate 70 can thereby move in the second direction D2.

Second Preferred Embodiment

Figure 9A:
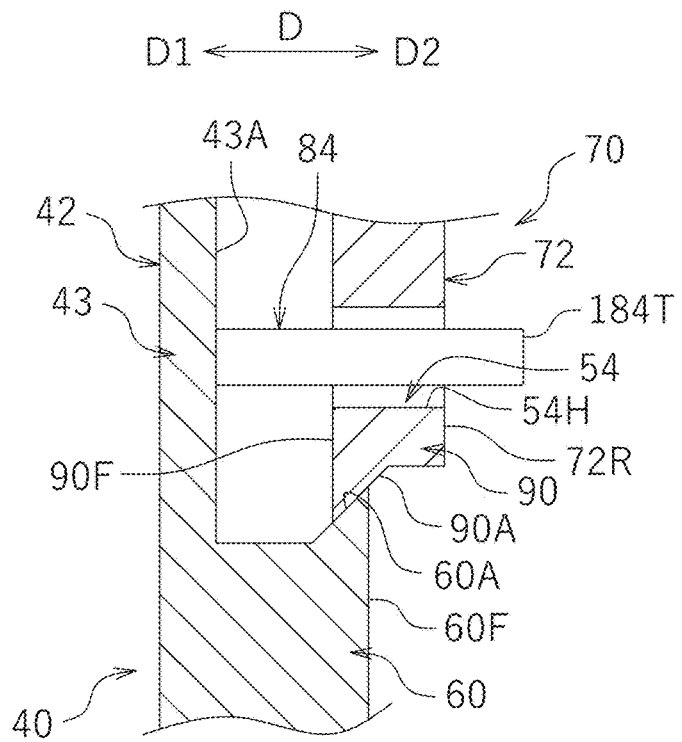
FIG. 9A is a cross-sectional view illustrating a state where a clutch center according to another preferred embodiment of the present invention and a pressure plate are normally combined.

In the preferred embodiment described above, the bosses 84 are located on the pressure plate 70, and the through holes 54H are located in the spring housing portions 54 of the clutch center 40. However, the present disclosure is not limited to this example. For example, as illustrated in FIG. 9A, the through holes 54H may be located in the spring housing portions 54 of the pressure plate 70 with the bosses 84 located on the clutch center 40. In this case, the clutch center 40 is located between the clutch using 30 and the pressure plate 70.

As illustrated in FIG. 9A, the pressure plate 70 includes the spring housing portions 54. The spring housing portions 54 are located in the body 72 including the pressure-side cam portions 90. The spring housing portions 54 are recessed in the first direction D1 from the back surface 72R of the body 72. The back surface 72R of the body 72 is an example of the surface of the body 72 on the side of the second direction D2. The spring housing portions 54 are arranged at regular or substantially regular intervals in the circumferential directions S of the pressure plate 70. The spring housing portions 54 include the through holes 54H which penetrate the spring housing portions 54 and in which the bosses 84 are inserted.

As illustrated in FIG. 9A, the clutch center 40 includes the plurality of (for example, three in this preferred embodiment) bosses 84. The bosses 84 support the pressure plate 70. The bosses 84 are arranged at regular or substantially regular intervals in the circumferential directions S. The bosses 84 extend in the directions D. The bosses 84 are disposed on the base wall 43 of the body 42. The bosses 84 are located between the center-side assist cam surface 60A and the center-side slipper cam surface 60S with respect to the circumferential directions S. The bosses 84 extend from the surface 43A of the base wall 43 toward the pressure plate 70 (i.e., in the second direction D2).

Figure 9B:
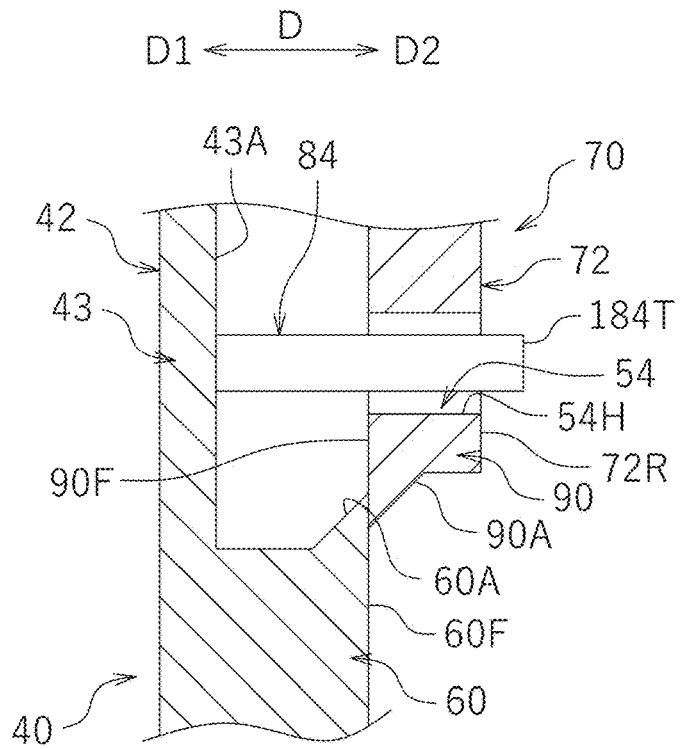
FIG. 9B is a cross-sectional view illustrating a state where a pressure plate according to another preferred embodiment of the present invention rides on a clutch center.

As illustrated in FIG. 9A, in the combined state, distal ends 184T of the bosses 84 project outward from the through holes 54H. The distal ends 184T of the bosses 84 are ends of the bosses 84 on the side of the second direction D2. As illustrated in FIG. 9B, while the surfaces 90F of the pressure-side cam portions 90 and surfaces 60F of the center-side cam portions 60 are in contact (e.g., surface contact) with each other (i.e., in the state where the pressure plate 70 rides on the clutch center 40), the distal ends 184T of the bosses 84 project outward from the through holes 54H. More specifically, while the surfaces 90F of the pressure-side cam portions 90 and the surfaces 60F of the center-side cam portions 60 are in contact with each other, the distal ends 184T of the bosses 84 project outward from the back surface 72R of the body 72 of the pressure plate 70. While the surfaces 90F of the pressure-side cam portions 90 and the surfaces 60F of the center-side cam portions 60 are in contact with each other, the distal ends 184T of the bosses 84 are located ahead of the back surface 72R in the second direction D2. Thus, in combining the clutch center 40 and the pressure plate 70, for example, even if the surfaces 90F of the pressure-side cam portions 90 and the surfaces 60F of the center-side cam portions 60 contact each other, the bosses 84 projecting outward from the through holes 54H can be held. Rotation of the pressure plate 70 in the circumferential directions S with the bosses 84 held, for example, can cancel the state where the pressure plate 70 rides on the clutch center 40, and the positional relationship among the pressure-side assist cam surface 90A, the center-side assist cam surface 60A, the pressure-side slipper cam surface 90S, and the center-side slipper cam surface 60S can be corrected.

In the clutch device 10 according to this preferred embodiment, the pressure plate 70 includes the body 72 including the pressure-side cam portions 90, and the spring housing portions 54 recessed in the first direction D1 from the back surface 72R of the body 72 and housing the pressure springs 25 that bias the pressure plate 70 in the first direction D1, the bosses 84 are formed on the clutch center 40, the through holes 54H are located in the spring housing portions 54 of the pressure plate 70, and the distal ends 184T of the bosses 84 are located ahead of the back surface 72R of the body 72 in the second direction D2 while the surfaces 90F of the pressure-side cam portions 90 and the surfaces 60F of the center-side cam portions 60 are in contact with each other. In this configuration, even when the pressure plate 70 rides on the clutch center 40, the bosses 84 located on the clutch center 40 project outward from the through holes 54H located in the spring housing portions 54. At this time, the distal ends 184T of the bosses 84 are located ahead of the back surface 72R of the body 72 in the second direction D2. Accordingly, the bosses 84 can be easily held.

In the preferred embodiments described above, the through holes 54H are located in the spring housing portions 54. However, the present disclosure is not limited to this example. The through holes 54H may penetrate the base wall 43 of the clutch center 40, or may penetrate the pressure-side cam portions 90 of the pressure plate 70.

In the preferred embodiments described above, the output shaft holding portion 50 of the clutch center 40 and the spline fitting portion 46 located on the outer peripheral wall 45 are integrally formed, but may be separate structural members. That is, the clutch center 40 may include a first clutch member including the output shaft holding portion 50 and a second clutch member formed as a separate structural member from the first clutch member and including the spline fitting portion 46 and use the first clutch member and the second clutch member in combination.

Third Preferred Embodiment

Figure 10:
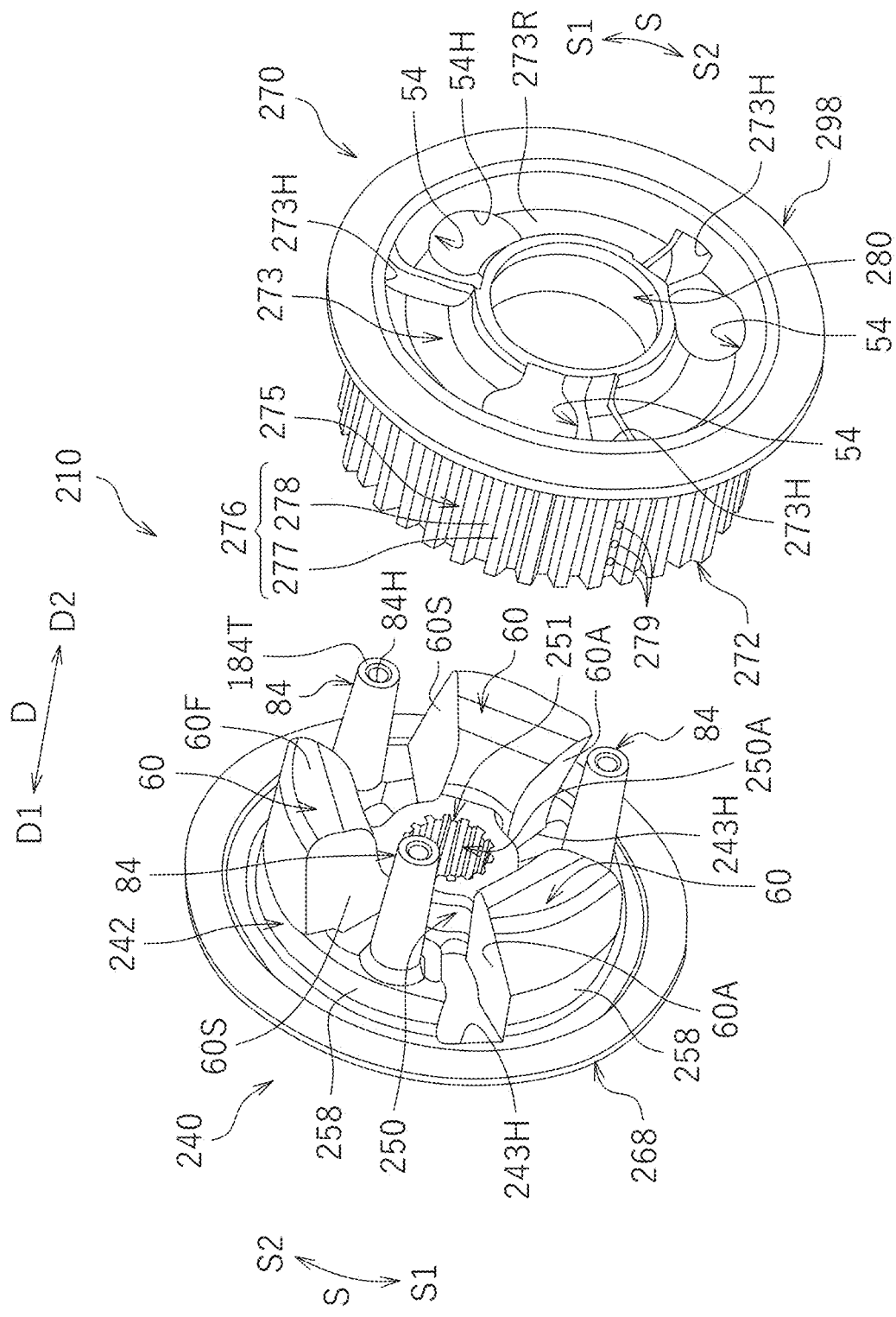
FIG. 10 is a disassembled perspective view of a clutch center and a pressure plate according to another preferred embodiment of the present invention.

FIG. 10 is a disassembled perspective view of a clutch center 240 and a pressure plate 270 of a clutch device 210 according to a third preferred embodiment.

The clutch center 240 is housed in a clutch housing 30 (see FIG. 1). The clutch center 240 and the clutch housing 30 are concentrically disposed. As illustrated in FIG. 10, the clutch center 240 includes a body 242, and a flange 268 connected to an outer edge of the body 242 on the side of a first direction D1 and extending radially outward. The body 242 projects from the flange 268 in a second direction D2. The clutch center 240 does not hold output-side rotating plates 22. The clutch center 240 is rotationally driven together with an output shaft 15 (see FIG. 1).

As illustrated in FIG. 10, the body 242 includes an output shaft holding portion 250, a plurality of center-side cam portions 60, and a center-side fitting portion 258. The center-side cam portions 60 project from the flange 268 in the second direction D2. The center-side cam portions 60 are located radially outward of the output shaft holding portion 250.

The output shaft holding portion 250 has a cylindrical shape. The output shaft holding portion 250 has an insertion hole 251 in which the output shaft 15 (see FIG. 1) is inserted and spline-fitted. The insertion hole 251 penetrates the body 242. An inner peripheral surface 250A of the output shaft holding portion 250 defining the insertion hole 251 has a plurality of spline grooves along the axial direction. The output shaft 15 is coupled to the output shaft holding portion 250.

As illustrated in FIG. 10, the clutch center 240 includes a plurality of (for example, three in this preferred embodiment) bosses 84. The bosses 84 are located radially outward of the output shaft holding portion 250. The bosses 84 are disposed on the body 242.

As illustrated in FIG. 10, the clutch center 240 includes center-side cam holes 243H penetrating the body 242 and a portion of the flange 268. The center-side cam holes 243H penetrate the body 242 and the flange 268 in directions D. The center-side cam holes 243H extend from portions on the side of the output shaft holding portion 250 to the flange 268. The center-side cam holes 243H are located between the center-side assist cam surfaces 60A of the center-side cam portions 60 and the bosses 84. When seen in the axial direction of the clutch center 240, the center-side assist cam surfaces 60A overlap with a portion of the center-side cam holes 243H.

As illustrated in FIG. 10, the center-side fitting portion 258 is disposed on the body 242. The center-side fitting portion 258 is located radially outward of the center-side cam portions 60. The center-side fitting portion 258 is located ahead of the center-side cam portions 60 in the first direction D1. The center-side fitting portion 258 is configured to slidably fit in the pressure-side fitting portion 288 (see FIG. 11).

The pressure plate 270 is movable toward or away from the clutch center 240 and rotatable relative to the clutch center 240. The pressure plate 270 is configured to press the input-side rotating plates 20 and the output-side rotating plates 22. The pressure plate 270 is disposed coaxially with the clutch center 240 and the clutch housing 30. The pressure plate 270 includes a cylindrical body 272, and a flange 298 extending radially outward from the outer edge of the body 272. The pressure plate 270 holds the plurality of output-side rotating plates 22 alternately arranged with the input-side rotating plates 20 in the directions D.

Figure 11:
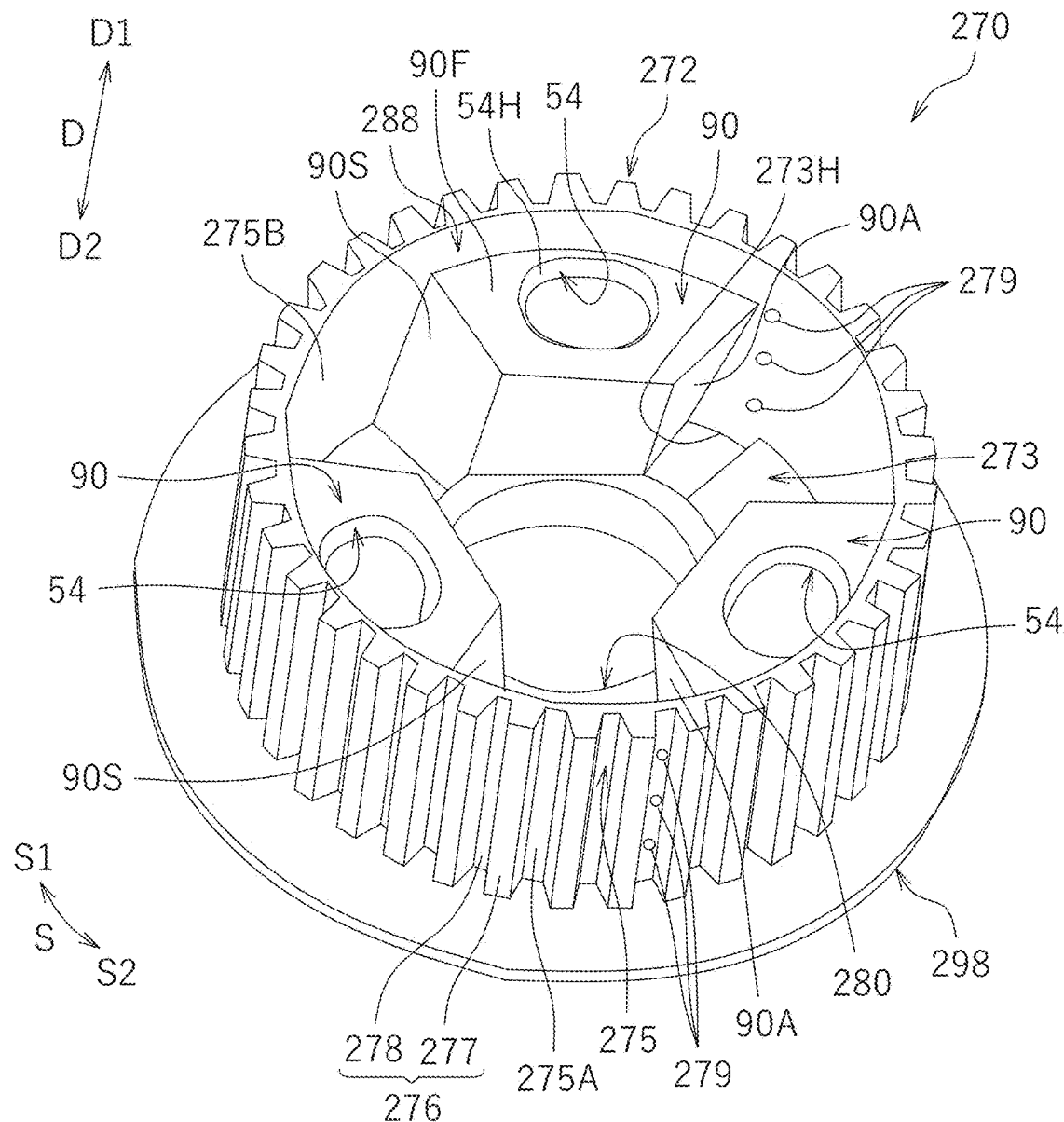
FIG. 11 is a perspective view of a pressure plate according to another preferred embodiment of the present invention.

As illustrated in FIG. 11, the body 272 includes a ring-shaped base wall 273, an outer peripheral wall 275 located radially outward of the base wall 273 and extending in the first direction D1, a cylindrical portion 280 disposed at the center of the base wall 273, a plurality of pressure-side cam portions 90 connected to the base wall 273 and the outer peripheral wall 275, a pressure-side fitting portion 288, and spring housing portions 54 (see FIG. 10). The pressure-side cam portions 90 project from the body 272 in the first direction D1. The pressure-side cam portions 90 are located radially outward of the cylindrical portion 280. The pressure-side cam portions 90 are located radially inward of the outer peripheral wall 275.

The cylindrical portion 280 has a cylindrical shape. The cylindrical portion 280 is formed integrally with the pressure-side cam portions 90. The cylindrical portion 280 receives clutch oil that has flowed out from the distal end 15T of the output shaft 15.

As illustrated in FIG. 11, the outer peripheral wall 275 of the pressure plate 270 is located radially outward of the cylindrical portion 280. The outer peripheral wall 275 has a ring shape extending in the directions D. An outer peripheral surface 275A of the outer peripheral wall 275 has a spline fitting portion 276. The spline fitting portion 276 includes a plurality of pressure-side fitting teeth 277 extending in the axial direction of the pressure plate 270 along the outer peripheral surface 275A of the outer peripheral wall 275, a plurality of spline grooves 278 each located between adjacent ones of the pressure-side fitting teeth 277 and extending in the axial direction of the pressure plate 270, and oil flow holes 279. The pressure-side fitting teeth 277 hold the output-side rotating plates 22. The plurality of pressure-side fitting teeth 277 are arranged in the circumferential directions S. The plurality of pressure-side fitting teeth 277 are arranged at regular or substantially regular intervals in the circumferential directions S. The plurality of pressure-side fitting teeth 277 have the same or substantially the same shape. The pressure-side fitting teeth 277 project radially outward from the outer peripheral surface 275A of the outer peripheral wall 275. The oil flow holes 279 penetrate the outer peripheral wall 275 in the radial directions. Each of the oil flow holes 279 is located between adjacent ones of the pressure-side fitting teeth 277. That is, the oil flow holes 279 are located in the spline grooves 278. The oil flow holes 279 are located at the sides of the pressure-side cam portions 90. The oil flow holes 279 are located at the sides of pressure-side assist cam surfaces 90A of the pressure-side cam portions 90. The oil flow holes 279 are located ahead of the pressure-side assist cam surfaces 90A in the first circumferential direction S1. The oil flow holes 279 are located ahead of pressure-side slipper cam surfaces 90S in the second circumferential direction S2. In this preferred embodiment, three oil flow holes 279 are located in each of three portions of the peripheral wall 275 in the circumferential directions S. The oil flow holes 279 are arranged at regular or substantially intervals in the circumferential directions S. The oil flow holes 279 cause the inside and outside of the pressure plate 270 to communicate with each other. The oil flow holes 279 allow clutch oil that has flowed out of the output shaft 15 into the pressure plate 270 to be discharged to the outside of the pressure plate 270. In this preferred embodiment, the oil flow holes 279 allow clutch oil flowing at an inner peripheral surface 275B of the peripheral wall 275 to be discharged to the outside of the pressure plate 270. At least a portion of the oil flow holes 279 is located at a position facing the center-side fitting portion 258 (see FIG. 10).

The output-side rotating plates 22 are held by the spline fitting portion 276 of the pressure plate 270. The output-side rotating plates 22 are held by the pressure-side fitting teeth 277 and the spline grooves 278 by spline-fitting. The output-side rotating plates 22 are displaceable along the axial direction of the pressure plate 270. The output-side rotating plates 22 are rotatable together with the pressure plate 270.

As illustrated in FIGS. 10 and 11, the pressure plate 270 includes pressure-side cam holes 273H penetrating a portion of the base wall 273. The pressure-side cam holes 273H penetrate the base wall 273 in the directions D. The pressure-side cam holes 273H are located radially outward of the cylindrical portion 80. The pressure-side cam holes 273H extend from the sides of the cylindrical portion 80 to the outer peripheral wall 275. Each of the pressure-side cam holes 273H penetrates a portion between adjacent ones of the pressure-side cam portions 90. Each of the pressure-side cam holes 273H penetrates a portion between the pressure-side assist cam surface 90A and the pressure-side slipper cam surface 90S of adjacent ones of the pressure-side cam portions 90. When seen in the axial direction of the pressure plate 270, the pressure-side assist cam surfaces 90A overlap with a portion of the pressure-side cam holes 273H. Clutch oil flows into the pressure-side cam holes 273H from the outside of the pressure plate 270.

As illustrated in FIG. 11, the pressure-side fitting portion 288 is located radially outward of the cylindrical portion 280. The pressure-side fitting portion 288 is located radially outward of the pressure-side cam portions 90. The pressure-side fitting portion 288 is located ahead of the pressure-side cam portions 90 in the first direction D1. The pressure-side fitting portion 288 is located on the inner peripheral surface 275B of the peripheral wall 275. The pressure-side fitting portion 288 is configured to slidably fit onto the center-side fitting portion 258 (see FIG. 10). A gap is located between the pressure-side fitting portion 288 and the center-side fitting portion 258.

As illustrated in FIG. 11, the spring housing portions 54 are located in the pressure-side cam portions 90. The spring housing portions 54 include the through holes 54H which penetrate the spring housing portions 54 and in which the bosses 84 (see FIG. are inserted. The through holes 54H penetrate the pressure-side cam portions 90. In this preferred embodiment, in a manner similar to the example illustrated in FIG. 9B, while the surfaces 90F of the pressure-side cam portions 90 (see FIG. 11) and the surfaces 60F of the center-side cam portions 60 (see FIG. 10) are in contact (e.g., surface contact) with each other (i.e., in the state where the pressure plate 270 rides on the clutch center 240), the distal ends 184T of the bosses 84 (see FIG. 10) project outward from the through holes 54H. More specifically, while the surfaces 90F of the pressure-side cam portions 90 and the surfaces 60F of the center-side cam portions 60 are in contact with each other, the distal ends 184T of the bosses 84 project outward from the back surface 273R of the base wall 273 of the pressure plate 270.

In the third preferred embodiment, the bosses 84 are located on the clutch center 240, and the through holes 54H are formed in the spring housing portions 54 of the pressure plate 270. However, the present disclosure is not limited to this example. For example, in a manner similar to the first preferred embodiment, the through holes 54H may be located in the spring housing portions 54 of the clutch center 240 with the bosses 84 formed on the pressure plate 270.

The following Clause provides other specific aspects of the technique disclosed herein.

Clause 1: A clutch device to allow or interrupt transfer of a rotation driving force of an input shaft to an output shaft, the clutch device including a clutch center housed in a clutch housing holding a plurality of input-side rotating plates rotationally driven by rotational driving of the input shaft, the clutch center holding a plurality of output-side rotating plates and being operable to be rotationally driven together with the output shaft, the input-side rotating plates and the output-side rotating plates being alternately arranged, and a pressure plate movable toward or away from the clutch center and rotatable relative to the clutch center, the pressure plate being operable to press the input-side rotating plates and the output-side rotating plates, wherein the pressure plate includes a pressure-side cam portion including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce a pressing force between the input-side rotating plates and the output-side rotating plates upon rotation relative to the clutch center, the clutch center includes a center-side cam portion including at least one of a center-side assist cam surface and a center-side slipper cam surface, the center-side assist cam surface being operable to generate a force in a direction from the pressure plate toward the clutch center in order to increase the pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate, and assuming directions in which the pressure plate moves are movement directions, a direction in which the pressure plate moves toward the clutch center is a first direction, and a direction in which the pressure plate moves away from the clutch center is a second direction, at least one of the pressure plate and the clutch center includes a boss extending in the movement directions, and the other of the pressure plate and the clutch center includes a through hole which penetrates therethrough along the movement directions and in which the boss is insertable, the through hole extends in circumferential directions and allows movement of the boss along the circumferential directions and the movement directions, and while a surface of the pressure-side cam portion on a side of the first direction and a surface of the center-side cam portion on a side of the second direction are in contact with each other, a distal end of the boss projects outward from the through hole.

The foregoing description is directed to the preferred embodiments of the present disclosure. The preferred embodiments described above, however, are merely examples, and the present disclosure can be performed in various modes and through various preferred embodiments.

In the preferred embodiments described above, each of the center-side cam portions 60 includes the center-side assist cam surface 60A and the center-side slipper cam surface 60S, but only needs to include at least one of the center-side assist cam surface 60A or the center-side slipper cam surface 60S.

In the preferred embodiments described above, each of the pressure-side cam portions 90 includes the pressure-side assist cam surface 90A and the pressure-side slipper cam surface 90S, but only needs to include at least one of the pressure-side assist cam surface 90A or the pressure-side slipper cam surface 90S.

In the third preferred embodiment described above, the clutch center 240 is configured not to hold the output-side rotating plates 22, but the present disclosure is not limited to this example. The clutch center 240 may include center-side fitting teeth having a configuration similar to that of the pressure-side fitting teeth 77 of the first preferred embodiment capable of holding the output-side rotating plates 22.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A clutch device to allow or interrupt transfer of a rotation driving force of an input shaft to an output shaft, the clutch device comprising:
    a clutch center housed in a clutch housing holding a plurality of input-side rotating plates rotationally driven by rotational driving of the input shaft, the clutch center holding a plurality of output-side rotating plates and being operable to be rotationally driven together with the output shaft, the input-side rotating plates and the output-side rotating plates being alternately arranged; and
    a pressure plate movable toward or away from the clutch center and rotatable relative to the clutch center, the pressure plate being operable to press the input-side rotating plates and the output-side rotating plates; wherein
    the pressure plate includes:
        a pressure-side cam portion including at least one of a pressure-side assist cam surface and a pressure-side slipper cam surface, the pressure-side assist cam surface being operable to generate a force in a direction from the pressure plate toward the clutch center in order to increase a pressing force between the input-side rotating plates and the output-side rotating plates upon rotation relative to the clutch center, the pressure-side slipper cam surface being operable to cause the pressure plate to move away from the clutch center in order to reduce a pressing force between the input-side rotating plates and the output-side rotating plates upon rotation relative to the clutch center;
    the clutch center includes:
        a center-side cam portion including at least one of a center-side assist cam surface and a center-side slipper cam surface, the center-side assist cam surface being operable to generate a force in a direction from the pressure plate toward the clutch center in order to increase the pressing force between the input-side rotating plates and the output-side rotating plates upon rotation relative to the pressure plate, the center-side slipper cam surface being operable to cause the pressure plate to move away from the clutch center in order to reduce the pressing force between the input-side rotating plates and the output-side rotating plates upon rotation relative to the pressure plate; and
        assuming directions in which the pressure plate moves are movement directions, a direction in which the pressure plate moves toward the clutch center is a first direction, and a direction in which the pressure plate moves away from the clutch center is a second direction, at least one of the pressure plate and the clutch center includes a boss extending in the movement directions, and the other of the pressure plate and the clutch center includes a through hole which penetrates therethrough along the movement directions and in which the boss is insertable;

the through hole extends in circumferential directions and allows movement of the boss along the circumferential directions and the movement directions; and while a surface of the pressure-side cam portion on a side of the first direction and a surface of the center-side cam portion on a side of the second direction are in contact with each other, a distal end of the boss projects outward from the through hole.

2. The clutch device according to claim 1, wherein the clutch center includes:

a body including the center-side cam portion; and a spring housing portion recessed in the second direction from a surface of the body on a side of the first direction and housing a pressure spring, the pressure spring being operable to bias the pressure plate in the first direction;

the boss is located on the pressure plate;

the through hole is located in the spring housing portion of the clutch center; and while the surface of the pressure-side cam portion on the side of the first direction and the surface of the center-side cam portion on the side of the second direction are in contact with each other, the distal end of the boss is located ahead, in the first direction, of the surface of the body on the side of the first direction.

3. The clutch device according to claim 2, wherein the center-side cam portion includes the center-side assist cam surface and the center-side slipper cam surface; and the pressure-side cam portion includes the pressure-side assist cam surface and the pressure-side slipper cam surface.

4. The clutch device according to claim 1, wherein the pressure plate includes:

a body including the pressure-side cam portion; and a spring housing portion recessed in the first direction from a surface of the body on a side of the second direction and housing a pressure spring, the pressure spring being operable to bias the pressure plate in the first direction;

the boss is located on the clutch center;

the through hole is located in the spring housing portion of the pressure plate; and while the surface of the pressure-side cam portion on the side of the first direction and the surface of the center-side cam portion on the side of the second direction are in contact with each other, the distal end of the boss is located ahead, in the second direction, of the surface of the body on the side of the second direction.

5. A motorcycle comprising the clutch device according to claim 1.

* * * * *